Aug. 11, 1970  C. HOFMANN  3,523,721
SPHERICALLY CORRECTED FRESNEL LENSES AND
MIRRORS WITH PARTIAL FIELD CORRECTION
Filed Dec. 9, 1968  2 Sheets-Sheet 1

INVENTOR
Christian Hofmann

United States Patent Office 3,523,721
Patented Aug. 11, 1970

3,523,721
SPHERICALLY CORRECTED FRESNEL LENSES AND MIRRORS WITH PARTIAL FIELD CORRECTION
Christian Hofmann, Jena, Germany, assignor to VEB Carl Zeiss Jena, Jena, Germany
Continuation-in-part of application Ser. No. 473,872, July 21, 1965. This application Dec. 9, 1968, Ser. No. 791,530
Int. Cl. G02b *3/08*
U.S. Cl. 350—211                 3 Claims

ABSTRACT OF THE DISCLOSURE

Defining equations are proposed for the echelon structure of Fresnel lenses and mirrors and the echelon-carrying face. Lenses and mirrors defined by these equations are without spherical aberration in their meridional plane when imaging object points in or near their optical axis, and are corrected spherically and for coma when imaging off-axis points.

---

Figure 1:
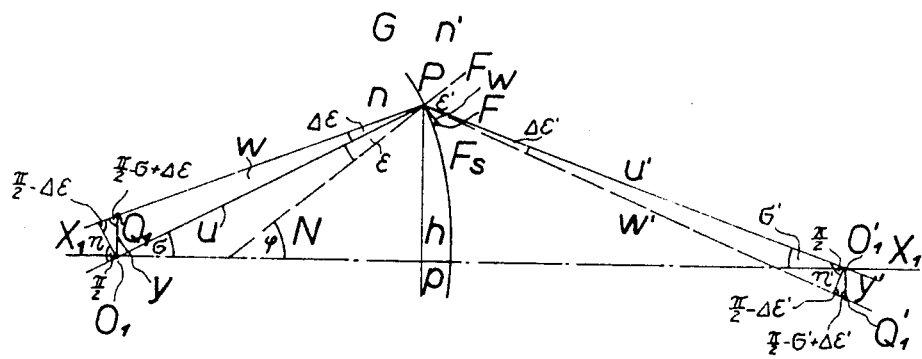

This application is a continuation-in-part of my co-pending application Ser. No. 473,872 filed on July 21, 1965, now abandoned.

This invention relates to spherically corrected Fresnel lenses and mirrors with partial field correction having their echelon system on an optically effective face.

Most of the known Fresnel lenses because of their echelons are without sphercial aberration, excepting of course the unavoidable residual aberration inherent in echelon systems. There is however a pronounced coma in the image even quite near the optical axis.

Field correction in proximity to the axis of Fresnel lenses or mirrors can to some extent be improved by giving the face a definite curvature which satisfies the sine condition. This curvature reduces the absolute magnitude of the aberration but does not eliminate it entirely. Furthermore, such lenses or mirrors have shown to lack an essential feature of aplanasy, namely the capacity freely to image off-axis object points without asymmetry errors. Therefore, asymmetrical aberration still exists.

The invention is based on the knowledge that obeying the sine law in Fresnel lenses and mirrors does not warrant coma-free ray fusion even near the axis, and that this failure of the sine law is due to the inapplicability of the Fermat principle to such lenses and mirrors.

It is an object of the present invention to provide Fresnel lenses and mirrors which are without spherical aberration and are corrected for coma either in respect of points near the optical axis or in respect of any desired off-axis object point.

To this end the invention consists in a spherically corrected Fresnel lens or mirror with partial field correction having an echelon system on at least one of its two optically effective faces, characterized in that the curvature in the meridional plane of the face satisfies the equation $$n' \frac{h \sin \epsilon' + \beta' y \sin \delta' \cos \varphi}{\sqrt{h^2 - 2hy\beta' \sin^2 \delta' + y^2 \beta'^2 \sin^2 \delta'}} - n \frac{h \sin \epsilon + y \sin \delta \cos \varphi}{\sqrt{h^2 - 2hy \sin^2 \delta + y^2 \sin^2 \delta}} = 0 \quad (1)$$

and that the two effective flanks of the echelons satisfy the equation $$\tan \varphi = \frac{n' \sin \delta' - n \sin \delta}{n' \cos \delta' - n \cos \delta} \quad (2)$$

and in which $h$=the height of incidence of the aperture beam at the face;
$y$=the space intervening between the optical axis and an object point in respect of which field correction is desired;
$\beta'$=the image scale;
$\varphi$=the angle enclosed by the optical axis and the normal to the effective echelon flank;
$n$=the refractive index of the medium in front of the face of the lens or mirror;
$n'$=the refractive index of the medium in the rear of the face of the lens or mirror;
$\delta$=the angle enclosed by the optical axis and the aperture beam on the object side;
$\delta'$=the angle enclosed by the optical axis and the aperture beam on the image side;
$\epsilon$=the angle enclosed by the normal to the effective flank and the aperture beam on the object side;
$\epsilon'$=the angle enclosed by the normal to the effective flank and the aperture beam on the image side.

The equation 1 defining the face holds good for both Fresnel lenses and Fresnel mirrors corrected in respect of a point in the axis and in respect of a point in the image field. For a Fresnel lens to be properly corrected, both its faces must be so echeloned and curved as to satisfy the above-mentioned Equation 1. As in the case of a Fresnel mirror the angle of incidence is equal to the angle of reflection, and the light ray progresses in one and the same medium, the meridional plane of the face of the mirror is subject to the simplified defining equation $$\frac{h \cdot \sin \delta \cdot \cos \delta}{h \cdot \sin \delta' \cdot \cos \delta' - y \cdot \sin \delta' \cdot \sin \delta \cdot \sin (\delta + \delta')} + \beta' = 0 \quad (3)$$

The inclinations of the effective Fresnel flanks obey Equation 2, which can in this case be simplified to $$\varphi = \frac{\delta' + \delta}{2}$$

In the Fresnel lenses and mirrors referred to hereinbefore the meridional curves of the faces are assumed to be asymmetric to the optical axis. A Fresnel lens or mirror which in construction and accordingly in respect of spherical correction is symmetric to a plane or to the optical axis and which produces faultless aplanatic images only of the objects in the space near the axis, has a face which satisfies the defining equation $$\frac{n \sin \delta \cos \delta \cos \epsilon}{n' \sin \delta' \cos \delta' \cos \epsilon'} - \beta' = 0 \quad (4)$$

In a Fresnel lens of this kind the image point or the object point of the surface carrying the echelons is an aplanatic point in the other spherical lens surface, provided that this other surface is no aplanatic Fresnel surface.

In a Fresnel mirror of the said kind, $-n$ and $-\epsilon$ of the defining Equaltion 4 are respectively equal to $n'$ and $\epsilon'$, so that the face of the apalantically imaging Fresnel mirror corresponds to $$\frac{\sin \delta \cos \delta}{\sin \delta' \cos \delta'} + \beta' = 0$$

the echelon structure being defined by Equation 2.

It is understood that each of the defining equations referred to hereinbefore may change as to its form if it does not thereby take on a different mathematical and optical meaning.

The Fresnel lenses or mirrors according to the invention may be of either synthetic material or glass. The Fresnel mirrors may be of metal. The mode of operation is independent of whether the echelons are set up on the face or whether the face envelops or intersects them.

Figure 2:
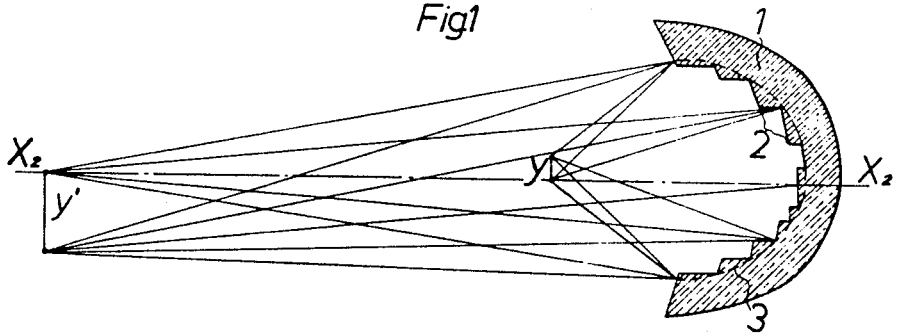
Figure 3:
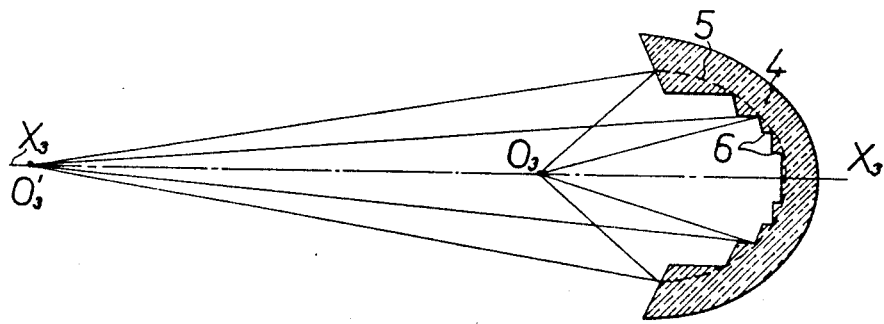
Figure 4:
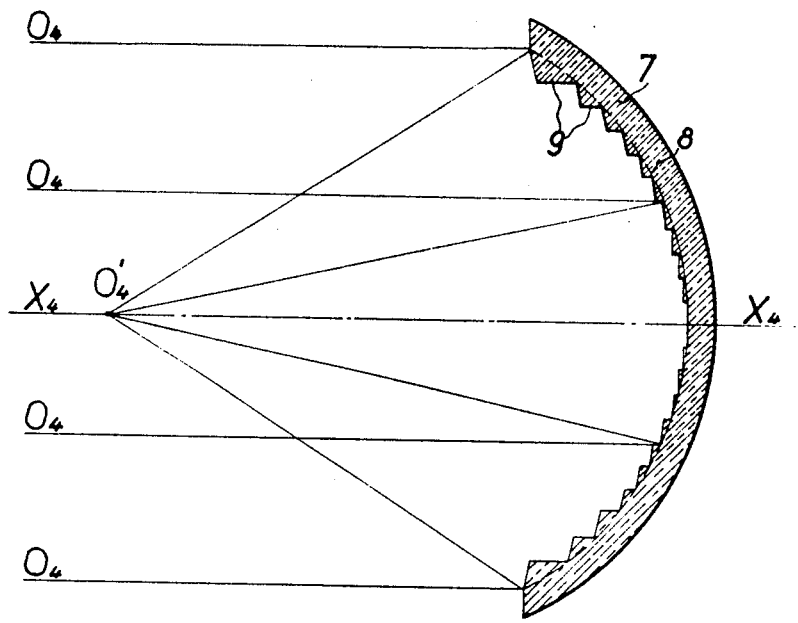
Figure 5:
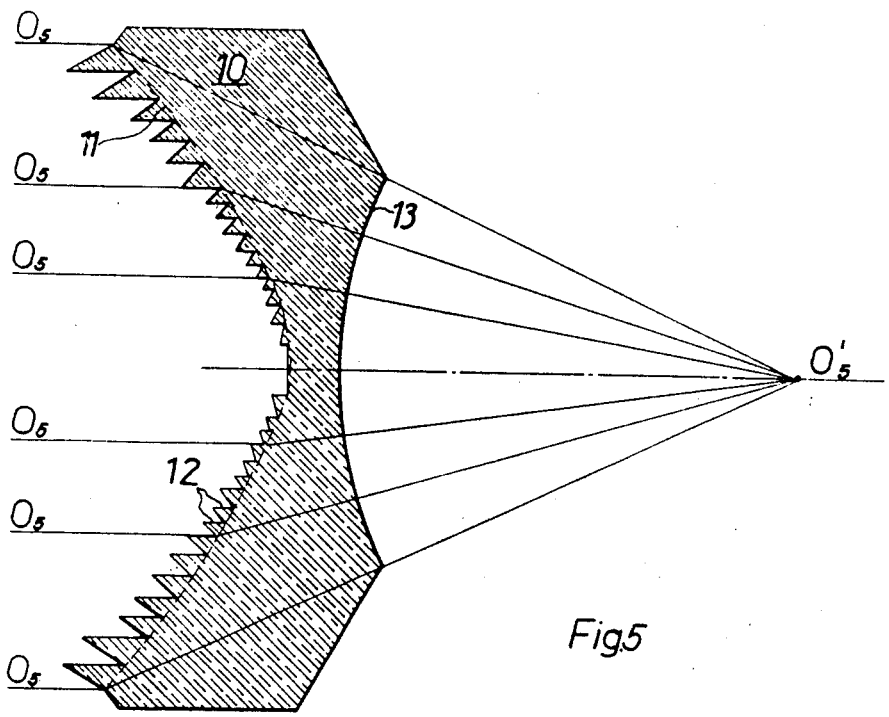

In order that the invention may be more readily understood, reference is made to the accompanying drawings which illustrate diagrammatically and by way of example four embodiments thereof in meridional sections, and in which FIG. 1 is a schematic representation which illustrates the functions of the Fresnel lenses and mirrors according to the invention and explains the meanings of the symbols used for deducing the defining equations;

FIGS. 2, 3 and 4 show various image-forming possibilities with the aid of the mirror of the invention: FIG. 2 shows the construction of a mirror for the formation of an image of an object in the finite zone at right angles to the optical axis, FIG. 3 shows construction of a mirror for formation of an image of a punctiform object in the finite zone of the optical axis, and FIG. 4 shows the construction of a mirror for forming an image of an object at infinity;

FIG. 5 shows an aplanatic Fresnel lens.

FIG. 1 shows a face G which has an optical axis $X_1$—$X_1$ and carries Fresnel echelons F (only one being shown for the sake of clarity). The effective and the disturbing non-imaging flanks of the Fresnel echelons F are respectively designated $F_w$ and $F_s$. The face G images both an axial object point $O_1$ and an off-axis object point $Q_1$ which lies at a distance $y$ at right angles to the optical axis $X_1$—$X_1$. The respective image points $O_1'$ and $Q_1'$ lie in a line at right angles to the optical axis $X_1$—$X_1$ and have a distance apart $y'$. The letters $n$ and $n'$ designate respectively the refractive indices of the optical media at either side of the face G. The effective flank of the echelon F intersects the face G at a point P, which is at a distance $h$ from the axis $X_1$—$X_1$. The normal N to the effective echelon flank and the optical axis $X_1$—$X_1$ enclose the angle $\varphi$.

The point P lies in an aperture beam $u$ proceeding from the axial object point $O_1$ as well as in a coma ray $w$ proceeding from the off-axis object point $Q_1$. The beams $u$ and $w$ are refracted at the point P and become respectively beams $u'$ and $w'$. The aperture beams $u$ and $u'$ strike the optical axis $X_1$—$X_1$ respectively at the angles $\delta$ and $\delta'$, and together with the normal N they enclose angles $\epsilon$ and $\epsilon'$. The aperture ray $u$ and the coma ray $w$ form an angle $\Delta\epsilon$; and the aperture ray $u'$ and the coma ray $w'$ an angle $\Delta\epsilon'$. It is apparent from FIG. 1 that an aperture ray is an imaging ray which preceeds from an object point in the axis. It is also apparent that a coma ray is an imaging ray which proceeds from an off-axis object point. Both the aperture ray and the coma ray lie in the meridional plane.

A line $\eta$ at right angles to the aperture beam $u$ and containing the object point $O_1$ corresponds, in the image space, to a similar rectangular line $\eta'$. The line $\eta$, the object $y$ and part of the coma beam $w$ form a triangle having angles $$\delta \frac{\pi}{2} - \Delta\epsilon, \text{ and } \frac{\pi}{2} - \delta + \Delta\epsilon$$

Expressed in the above-mentioned terms, the distance apart of the axial object point $O_1$ and the point P is $h/\sin \delta$, and the distance apart from the image point $O_1'$ and the point P is $h/\sin \delta'$.

The equation for defining the face of a spherically and in part comatically corrected Fresnel lens or mirror can be deduced as follows.

Setting out from the relation $$\frac{\eta}{y} = \frac{\sin(90° - \delta + \Delta\epsilon)}{\sin(90° - \Delta\epsilon)}$$

which can easily be deduced from FIG. 1 of the drawings, it is apparent that $$\eta = y (\cos \delta + \tan \Delta\epsilon \sin \delta) \quad (5)$$

can be eliminated. Moreover, $$\tan \Delta\epsilon = \frac{\eta}{h} \sin \delta$$

Substituting in this equation the relation (5) for $\eta$ and resolving according to $\tan \Delta\epsilon$, the geometrical relations in the object space which are essential for the deduction can be represented by $$\tan \Delta\epsilon = \frac{y \sin \delta \cos \delta}{h - y \sin^2 \delta} \quad (6)$$

The Equation 6 can be split up into $$\sin \Delta\epsilon = \frac{y \sin \delta \cos \delta}{\sqrt{h^2 - 2hy \sin^2 \delta + y^2 \sin^2 \delta'}} \quad (7)$$

and $$\cos \Delta\epsilon = \frac{h - y \sin^2 \delta}{\sqrt{h^2 - 2hy \sin^2 \delta + y^2 \sin^2 \delta'}} \quad (8)$$

Analogous equations hold good, in the image space, for the angle $\Delta\epsilon'$, the angle $\delta'$ and the distance apart $y'$ of the image points $O_1'$ and $Q_1'$.

The mathematical combination of the geometry of the object space with that if the image space produces the law of refraction as follows:

$$n \sin (\epsilon + \Delta\epsilon) = n' \sin (\epsilon' + \Delta\epsilon') \quad (9)$$

Introducing into the law of refraction (9) and Equations 7 and 8, thereby observing the respective trigonometrical addition theorems, makes the law (9) take the form $$n' \frac{h \sin \epsilon' + y' \sin \delta' \cos (\delta' + \epsilon')}{\sqrt{h^2 - 2hy' \sin^2 \delta' + y'^2 \sin^2 \delta'}}$$
$$= n \frac{h \sin \epsilon + y \sin \delta \cos (\epsilon + \delta)}{\sqrt{h^2 - 2hy \sin^2 \delta + y^2 \sin^2 \delta}} \quad (10)$$

or, since $\delta + \epsilon = \varphi = \delta' + \epsilon'$, and $y' = \beta'y$, $$n' \frac{h \sin \epsilon' + \beta'y \sin \delta' \cos \varphi}{\sqrt{h^2 - 2hy\beta' \sin^2 \delta' + y^2\beta'^2 \sin^2 \delta'}}$$
$$- n \frac{h \sin \epsilon + y \sin \delta \cos \varphi}{\sqrt{h^2 - 2hy \sin^2 \delta + y^2 \sin^2 \delta}} = 0 \quad (10a)$$

This is the most general form of the equation defining the meridional section of a spherically corrected Fresnel lens or mirror having a partially corrected field. The sign of the root in the denominator depends on the sign of the denominator of the Equation 6.

The Equations 10 and 10a include the height $y$ of the object, the height $y'$ of the image, and the magnification $\beta'$. As is well known, these three values are bound up with one another, with the distance $s$ between object and lens apex, and with the distance $s'$ between lens apex and image, through the relationship $$\frac{y'}{y} = \beta' = \frac{n \cdot s'}{n' \cdot s}$$

as is shown in pages 15 and 16 of Brockhaus "ABC der Optik," edited by VEB F. A. Brockhaus Verlag, Leipzig, 1961, and pages 80 and 93 of Czapski-Eppenstein "Grundzüge der Theorie der optischen Instrumente," edited by Johann Ambrosius Barth, Leipzig, 1924, 3rd edition. Accordingly, if the distance $s' - s$ of the conjugate points $O_1$ and $O_1'$ from one another, the image scale $\beta'$, and the refractive indices $n$ and $n'$, are prescribed, the position of the face G is uniquely fixed. In this connection it should be noted that the term "lens apex" is intended to define the point of intersection between the face G with the optical axis $X_1$—$X_1$.

If the trigonometric functions $\sin \varphi$, $\cos \varphi$, $\sin \epsilon$, $\cos \epsilon$, $\sin \epsilon'$, $\cos \epsilon'$ appearing in Equation 10 and the equations subsequent thereto are expressed as depending on the angle δ, or δ', and on the said prescribed values, the following relationships obtain:

$$\sin \varphi = \frac{n' \cdot \sin \delta' - n \cdot \sin \delta}{\sqrt{n'^2 - 2n' \cdot n \cdot \cos(\delta' - \delta) + n^2}}$$

$$\cos \varphi = \frac{n' \cdot \cos \delta' - n \cdot \cos \delta}{\sqrt{n'^2 - 2n' \cdot n \cdot \cos(\delta' - \delta) + n^2}}$$

$$\sin \epsilon = \frac{n' \cdot \sin(\delta' - \delta)}{\sqrt{n'^2 - 2n' \cdot n \cdot \cos(\delta' - \delta) + n^2}}$$

$$\cos \epsilon = \frac{n' \cdot \cos(\delta' - \delta)}{\sqrt{n'^2 - 2n' \cdot n \cdot \cos(\delta' - \delta) + n^2}}$$

$$\sin \epsilon' = \frac{n \cdot \sin(\delta' - \delta)}{\sqrt{n'^2 - 2n' \cdot n \cdot \cos(\delta' - \delta) + n^2}}$$

$$\cos \epsilon' = \frac{n' - n \cdot \cos(\delta' - \delta)}{\sqrt{n'^2 - 2n' \cdot n \cdot \cos(\delta' - \delta) + n^2}}$$

The angular apertures δ and δ' depend as follows on the Cartesian coordinates $h$ and $p$ of the face G:

$$\sin \delta = \frac{h}{(s-p)\sqrt{1+\frac{h^2}{(s-p)^2}}}$$

$$\sin \delta' = \frac{h}{(s'-p)\sqrt{1+\frac{h^2}{(s'-p)^2}}}$$

$$\cos \delta = \frac{1}{\sqrt{1+\frac{h^2}{(s-p)^2}}}$$

$$\cos \delta' = \frac{1}{\sqrt{1+\frac{h^2}{(s'-p)^2}}}$$

This means however that the Equations 10 and 10a as well as the following Equations 11 and 12a refer to the dependence of the height $h$ on the rise $p$ of the face when the distances $s$ and $s'$ are prescribed. In this connection it should be noted that the term "rise" defines the distance of the optically effective face G from the base or foot of the normal $h$ on the optical axis $X_1$—$X_1$ (see FIG. 1). For the sake of clarity, the above-said relationships have not been introduced into the Equations 10a, 11 and 12a.

In the event of an image from or to infinity, there must be taken into account that $s \to \infty$, or $s' \to \infty$, from which there result corresponding particular cases of the above-mentioned equations.

The distances $s$ and $s'$ of each surface, the refractive indices $n$ and $n'$ (of lenses) and the image scale $\beta'$ are also prescribed. Accordingly, $h$ and $p$ are unknown in Equations 10a, 11 and 12a. It is advisable, therefore, to preselect $h$ in consistency with the breadths of the Fresnel echelons and to calculate $p$ by means of the Equations 10a, 11, or 12a, depending on the kind of imaging desired. Solving these equations, with $p$ included, is however very complicated and brings along a spate of intricate formulae. It is far easier to proceed from an approximation to $p$, repeatedly to go over the Equation 10a, 11, or 12a, and thereby to change $p$ iteratively until the equation is satisfied and the rise $p$ conjugate to the height $h$ is definitely ascertained. The unavoidable complexity of the formulae makes it advisable to have the face G calculated by a computer.

By very complex mathematical calculation it is possible to derive from the defining equation a more simple relation valid in particular for mirrors. This relation can be obtained more easily by considering that in mirrors $\tan \Delta\epsilon = -\tan \Delta\epsilon'$ and equating the right-hand side of Equation 6, which holds good for the object space, with the right-hand side of the analogous equation of the image space:

$$\frac{y \sin \delta \cos \delta}{h - y \sin^2 \delta} = -\frac{y' \sin \delta' \cos \delta'}{h - y' \sin^2 \delta'}$$

The defining equation thus obtained for a spherically and in part comatically corrected mirror can also be expressed:

$$\frac{h \sin \delta \cos \delta}{h \sin \delta' \cos \delta' - y \sin \delta' \sin \delta \sin(\delta + \delta')} = -\frac{y'}{y} = -\beta' \quad (11)$$

As regards aplanatic imaging in the near-axial space by means of a Fresnel lens or mirror, $y^2$ can in Equation 10 be set down as approximating 0, and for the remaining expression below the root a mathematical series can be developed, so that the respective defining equation ultimately reads $$ny \sin \delta \cos \delta \cos \epsilon = n'y' \sin \delta' \cos \delta' \cos \epsilon' \quad (12)$$

or, transformed, $$\frac{n \sin \delta \cos \delta \cos \epsilon}{n' \sin \delta' \cos \delta' \cos \epsilon'} = \frac{y'}{y} = \beta' \quad (12a)$$

In the case of reflection, $\epsilon = -\epsilon'$. Accordingly the following equation holds good for aplanatic mirrors:

$$\frac{\sin \delta \cos \delta}{\sin \delta' \cos \delta'} = -\frac{y'}{y} = -\beta' \quad (13)$$

The equation for defining echelon-flank inclination is obtained from the law of refraction as $$n \sin \epsilon = n' \sin \epsilon'$$

and the relation of the angles $\epsilon = \varphi - \delta$ becomes $$\tan \varphi = \frac{n' \sin \delta' - n \sin \delta}{n' \cos \delta' - n \cos \delta}$$

The refractive indices, the thickness of the lens and the breadth of the echelons may be any desired. To avoid diffraction phenomena on the one hand and too great a loss of light and too great zones in the image on the other hand, it is advisable to choose for the Fresnel glasses a breadth between 0.03 and 0.1 mm. From the foregoing it is apparent that adjacent echelon faces, though individually calculated as shown, are correlated to each other in that the object distance $s$ of the second face joins the image distance $s'$ of the first adjacent face.

In FIG. 2, a mirror 1 has echelons 2 on a face 3. The optical axis of the mirror is $X_2$—$X_2$. An object $y$ extending at right angles to the optical axis $X_2$—$X_2$ is imaged at $y'$, so that the end points are without image defects. Let it be assumed for example that the size of the object $y$ to be imaged is 10 mm., that the imaging scale $\beta'$ is −3, that the distance apart $s$ of the object and the mirror apex is −100 mm., that the distance apart $s'$ of the image $y'$ and the mirror apex is −300 mm., and that the focal length $f$ is 75 mm. In this case, the Fresnel mirror, schematically illustrated in FIG. 2 irrespective of scale, can be constructed with the aid of the following parameters:

| $h$ (mm.) | $p$ (mm.) | $\tan \varphi$ | $h$ (mm.) | $p$ (mm.) | $\tan \varphi$ |
|---|---|---|---|---|---|
| 0.00 | 0.000 | 0.0000000 | 6.00 | 0.717 | −0.0397472 |
| 0.05 | 0.010 | −0.0003333 | 7.00 | 0.743 | −0.0463549 |
| 0.10 | 0.020 | −0.0006666 | 8.00 | 0.744 | −0.0529683 |
| 0.15 | 0.030 | −0.0009998 | 9.00 | 0.718 | −0.0595911 |
| 0.20 | 0.039 | −0.0013329 | 10.00 | 0.665 | −0.0662274 |
| 0.25 | 0.049 | −0.0016660 | 11.00 | 0.585 | −0.0728811 |
| 0.30 | 0.059 | −0.0019990 | 12.00 | 0.480 | −0.0795563 |
| 0.35 | 0.068 | −0.0023320 | 13.00 | 0.348 | −0.0862571 |
| 0.40 | 0.078 | −0.0026649 | 14.00 | 0.188 | −0.0929879 |
| 0.45 | 0.087 | −0.0029978 | 15.00 | 0.000 | −0.0997531 |
| 0.50 | 0.097 | −0.0033306 | 16.00 | −0.216 | −0.1065573 |
| 0.55 | 0.106 | −0.0036634 | 17.00 | −0.460 | −0.1134052 |
| 0.60 | 0.115 | −0.0039962 | 18.00 | −0.732 | −0.1203021 |
| 0.65 | 0.124 | −0.0043288 | 19.00 | −1.035 | −0.1272532 |
| 0.70 | 0.133 | −0.0046615 | 20.00 | −1.367 | −0.1342642 |
| 0.75 | 0.142 | −0.0049940 | 21.00 | −1.731 | −0.1413410 |
| 0.80 | 0.151 | −0.0053266 | 22.00 | −2.126 | −0.1484902 |
| 0.85 | 0.160 | −0.0056591 | 23.00 | −2.553 | −0.1557186 |
| 0.90 | 0.169 | −0.0059915 | 24.00 | −3.015 | −0.1630338 |
| 0.95 | 0.178 | −0.0063239 | 25.00 | −3.511 | −0.1704437 |
| 1.00 | 0.186 | −0.0066563 | 26.00 | −4.043 | −0.1779574 |
| 2.00 | 0.346 | −0.0132945 | 27.00 | −4.613 | −0.1855844 |
| 3.00 | 0.478 | −0.0199187 | 28.00 | −5.222 | −0.1933356 |
| 4.00 | 0.584 | −0.0265329 | 29.00 | −5.872 | −0.2012228 |
| 5.00 | 0.664 | −0.0331411 | 30.00 | −6.565 | −0.2092594 |

| h (mm.) | p (mm.) | tan φ | h (mm.) | p (mm.) | tan φ |
|---|---|---|---|---|---|
| 0.00 | 0.000 | 0.0000000 | −6.00 | −1.706 | 0.0405610 |
| −0.05 | −0.010 | 0.0003334 | −7.00 | −2.093 | 0.0474697 |
| −0.10 | −0.020 | 0.0006668 | −8.00 | −2.511 | 0.0544351 |
| −0.15 | −0.030 | 0.0010003 | −9.00 | −2.961 | 0.0614632 |
| −0.20 | −0.041 | 0.0013338 | −10.00 | −3.444 | 0.0685605 |
| −0.25 | −0.051 | 0.0016674 | −11.00 | −3.961 | 0.0757342 |
| −0.30 | −0.061 | 0.0020010 | −12.00 | −4.513 | 0.0829919 |
| −0.35 | −0.072 | 0.0023347 | −13.00 | −5.101 | 0.0903418 |
| −0.40 | −0.082 | 0.0026685 | −14.00 | −5.727 | 0.0977930 |
| −0.45 | −0.093 | 0.0030023 | −15.00 | −6.392 | 0.1053555 |
| −0.50 | −0.103 | 0.0033362 | −16.00 | −7.099 | 0.1130405 |
| −0.55 | −0.114 | 0.0036701 | −17.00 | −7.850 | 0.1208603 |
| −0.60 | −0.125 | 0.0040042 | −18.00 | −8.646 | 0.1288288 |
| −0.65 | −0.136 | 0.0043382 | −19.00 | −9.491 | 0.1369618 |
| −0.70 | −0.147 | 0.0046724 | −20.00 | −10.389 | 0.1452772 |
| −0.75 | −0.158 | 0.0050065 | −21.00 | −11.342 | 0.1537957 |
| −0.80 | −0.169 | 0.0053408 | −22.00 | −12.354 | 0.1625414 |
| −0.85 | −0.180 | 0.0056751 | −23.00 | −13.432 | 0.1715424 |
| −0.90 | −0.191 | 0.0060095 | −24.00 | −14.582 | 0.1808324 |
| −0.95 | −0.202 | 0.0063440 | −25.00 | −15.810 | 0.1904518 |
| −1.00 | −0.214 | 0.0066785 | −26.00 | −17.125 | 0.2004502 |
| −2.00 | −0.455 | 0.0133835 | −27.00 | −18.539 | 0.2108897 |
| −3.00 | −0.725 | 0.0201195 | −28.00 | −20.067 | 0.2218493 |
| −4.00 | −1.023 | 0.0268912 | −29.00 | −21.726 | 0.2334329 |
| −5.00 | −1.350 | 0.0337033 | −30.00 | −23.542 | 0.2457813 |

This compilation shows that the Fresnel lens 1 due to one-sided location of the object y from the optical axis $X_2$—$X_2$ is unsymmetric, and that the echelons up to 1 mm. have the breadth of 0.05 mm. and beyond this a breadth of 1 mm. This change of breadth in the echelons has been introduced with a view to limiting the above compilation.

In FIG. 3, a mirror 4 having an optical axis $X_3$—$X_3$ carries echelons 6 on its aplanatic face 5, an object $O_3$ in or near the optical axis $X_3$—$X_3$ being apalanatically imaged at $O_3'$. Unlike the mirror of FIG. 2, the mirror 4 of FIG. 3 is symmetric to the optical axis $X_3$—$X_3$, since it images an object that is substantially symmetric to the optical axis.

FIG. 4 shows a Fresnel mirror 7 having a circular aplanatic face 8 and echelons 9. An object $O_4$ at infinity is aplanatically imaged at the locus $O_4'$ of the focus of the mirror 7. If the focal length $f$ of the schematically illustrated Fresnel mirror 7 is 100 mm., the data of this mirror, which is echeloned similarly to the mirror of FIG. 2, are as follows:

| h (mm.) | p (mm.) | tan φ | h (mm.) | p (mm.) | tan φ |
|---|---|---|---|---|---|
| 0.00 | 0.000 | 0.0000000 | 0.90 | −0.008 | −0.0045003 |
| 0.05 | −0.000 | −0.0002500 | 0.95 | −0.009 | −0.0047503 |
| 0.10 | −0.000 | −0.0005000 | 1.00 | −0.010 | −0.0050004 |
| 0.15 | −0.000 | −0.0007500 | 2.00 | −0.040 | −0.0100030 |
| 0.20 | −0.000 | −0.0010000 | 3.00 | −0.090 | −0.0150101 |
| 0.25 | −0.001 | −0.0012500 | 4.00 | −0.160 | −0.0200241 |
| 0.30 | −0.001 | −0.0015000 | 5.00 | −0.251 | −0.0250471 |
| 0.35 | −0.001 | −0.0017500 | 6.00 | −0.361 | −0.0300815 |
| 0.40 | −0.002 | −0.0020000 | 7.00 | −0.492 | −0.0351298 |
| 0.45 | −0.002 | −0.0022500 | 8.00 | −0.644 | −0.0401943 |
| 0.50 | −0.003 | −0.0025000 | 9.00 | −0.817 | −0.0452775 |
| 0.55 | −0.003 | −0.0027501 | 10.00 | −1.010 | −0.0503820 |
| 0.60 | −0.004 | −0.0030001 | 11.00 | −1.225 | −0.0555105 |
| 0.65 | −0.004 | −0.0032501 | 12.00 | −1.461 | −0.0606657 |
| 0.70 | −0.005 | −0.0035001 | 13.00 | −1.720 | −0.0658505 |
| 0.75 | −0.006 | −0.0037502 | 14.00 | −2.000 | −0.0710678 |
| 0.80 | −0.006 | −0.0040002 | 15.00 | −2.303 | −0.0763208 |
| 0.85 | −0.007 | −0.0042502 | 16.00 | −2.629 | −0.0816128 |

| h (mm.) | p (mm.) | tan φ | h (mm.) | p (mm.) | tan φ |
|---|---|---|---|---|---|
| 17.00 | −2.979 | −0.0869473 | 24.00 | −6.137 | −0.1258214 |
| 18.00 | −3.352 | −0.0923280 | 25.00 | −6.699 | −0.1316525 |
| 19.00 | −3.751 | −0.0977587 | 26.00 | −7.292 | −0.1375709 |
| 20.00 | −4.174 | −0.1032437 | 27.00 | −7.917 | −0.1435840 |
| 21.00 | −4.624 | −0.1087875 | 28.00 | −8.575 | −0.1496999 |
| 22.00 | −5.100 | −0.1143948 | 29.00 | −9.269 | −0.1559278 |
| 23.00 | −5.604 | −0.1200709 | 30.00 | −10.000 | −0.1622777 |

The Fresnel lens 7, owing to the desired imaging properties, is symmetric to the optical axis $X_4$—$X_4$.

FIG. 5 shows a convergent Fresnel lens 10 having on its one side an aplanatic face 11 and echelons 12 and on its other side an aplanatic face 13. The lens 10 produces in its focal plane an aplanatic image $O_5'$ of an object $O_5$ at infinity. If the Fresnel lens 10 (not drawn to scale) is of a thickness of 1.98 mm. and has a focal length $f=25.7$ mm., and if the radius of curvature of the aplanatic face is 23.72 mm., the Fresnel lens 10 can be constructed with the aid of the following parameters:

| h (mm.) | p (mm.) | tan φ | h (mm.) | p (mm.) | tan φ |
|---|---|---|---|---|---|
| 0.00 | 0.000 | 0.0000000 | 0.65 | −0.025 | 0.0758513 |
| 0.05 | −0.000 | 0.0058366 | 0.70 | −0.029 | 0.0816819 |
| 0.10 | −0.001 | 0.0116731 | 0.75 | −0.033 | 0.0875115 |
| 0.15 | −0.001 | 0.0175094 | 0.80 | −0.037 | 0.0933402 |
| 0.20 | −0.002 | 0.0233456 | 0.85 | −0.042 | 0.0991678 |
| 0.25 | −0.004 | 0.0291815 | 0.90 | −0.047 | 0.1049944 |
| 0.30 | −0.005 | 0.0350171 | 0.95 | −0.052 | 0.1108197 |
| 0.35 | −0.007 | 0.0408522 | 1.00 | −0.058 | 0.1166348 |
| 0.40 | −0.009 | 0.0466870 | 2.00 | −0.230 | 0.2327778 |
| 0.45 | −0.012 | 0.0525211 | 3.00 | −0.507 | 0.3479661 |
| 0.50 | −0.015 | 0.0583547 | 4.00 | −0.878 | 0.4618969 |
| 0.55 | −0.018 | 0.0641877 | 5.00 | −1.331 | 0.5743962 |
| 0.60 | −0.021 | 0.070019 | 6.00 | −1.853 | 0.6854127 |

| h (mm.) | p (mm.) | tan φ | h (mm.) | p (mm.) | tan φ |
|---|---|---|---|---|---|
| 7.00 | −2.431 | 0.7949877 | 13.00 | −6.621 | 1.4291886 |
| 8.00 | −3.056 | 0.9032229 | 14.00 | −7.390 | 1.5322777 |
| 9.00 | −3.718 | 1.0102522 | 15.00 | −8.170 | 1.6349238 |
| 10.00 | −4.411 | 1.1162223 | 16.00 | −8.960 | 1.7372106 |
| 11.00 | −5.128 | 1.2212789 | 17.00 | −9.758 | 1.8392102 |
| 12.00 | −5.866 | 1.3255593 | | | |

The number of echelons has been limited as with respect to FIGS. 2 and 4.

It is advisable so to choose the thickness $d$ of the lens of the invention that the object point of the second surface coincides with the image point of the first surface. This thickness is defined by the well-known relationship.

$$d = s_1' - s_2$$

wherein $s_1'$ refers to the first surface and denotes the distance between lens apex and image, and wherein $s_2$ refers to the second surface and denotes the distance between object and lens apex; cf. page 95 of Czapski-Eppenstein "Grundzüge der Theorie der optischen Instrumente," edited by Johann Ambrosius Barth, Leipzig, 1924, 3rd edition.

I claim:

1. A spherically corrected Fresnel lens with partial field correction, comprising two optical effective faces whose curvatures in the meridional plane are determined by the equation $$n' \frac{h \sin \epsilon' + \beta' y \sin \delta' \cos \varphi}{\sqrt{h^2 - 2hy\beta' \sin^2 \delta' + y^2 \beta'^2 \sin^2 \delta'}}$$

$$- n \frac{h \sin \epsilon + y \sin \delta \cos \varphi}{\sqrt{h^2 - 2hy \sin^2 \delta + y^2 \sin^2 \delta}} = 0$$

and a Fresnel system on one of said faces, said Fresnel systems consisting of echelons, each of said echelons having an effective and a disturbing non-imaging flank, the normal to said effective flank and the optical axis of the lens enclosing an angle satisfying the equation $$\tan \varphi = \frac{n' \sin \delta' - n \sin \delta}{n' \cos \delta' - n \cos \delta}$$

the trigonometric functions in the foregoing two equations signifying $$\sin \varphi = \frac{n' \cdot \sin \delta' - n \cdot \sin \delta}{\sqrt{n'^2 - 2n' \cdot n \cdot \cos(\delta' - \delta) + n^2}}$$

$$\cos \varphi = \frac{n' \cdot \cos \delta' - n \cdot \cos \delta}{\sqrt{n'^2 - 2n' \cdot n \cdot \cos(\delta' - \delta) + n^2}}$$

$$\sin \epsilon = \frac{n' \cdot \sin(\delta' - \delta)}{\sqrt{n'^2 - 2n' \cdot n \cdot \cos(\delta' - \delta) + n^2}}$$

$$\sin \epsilon' = \frac{n \cdot \sin(\delta' - \delta)}{\sqrt{n'^2 - 2n' \cdot n \cdot \cos(\delta' - \delta) + n^2}}$$

$$\sin \delta = \frac{h}{(s-p)\sqrt{1+\frac{h^2}{(s-p)^2}}} \quad \sin \delta' = \frac{h}{(s'-p)\sqrt{1+\frac{h^2}{(s'-p)^2}}}$$

$$\cos \delta = \frac{1}{\sqrt{1+\frac{h^2}{(s-p)^2}}} \quad \cos \delta' = \frac{1}{\sqrt{1+\frac{h^2}{(s'-p)^2}}}$$

$h$ being the height of incidence of the aperture beam and the coma beam at the face, $p$ the rise of this face, $y$ the space intervening between the optical axis and an object point in respect of which field correction is desired, $\beta'$ the image scale, $\varphi$ the angle enclosed by the optical axis and the normal to the effective echelon flank, $n$ the refractive index of the medium in front of the face, $n'$ the refractive index of the medium in the rear of the face, $\epsilon$ the angle enclosed by the normal to the effective echelon flank and the aperture beam on the object side, $\epsilon'$ the angle enclosed by the normal to the effective flank and the aperture beam on the image side, $\delta$ the angle enclosed by the optical axis and the aperture beam on the object side, $\delta'$ the angle enclosed by the optical axis and the aperture beam on the image side, $s$ the distance between object and lens apex, and $s'$ the distance between lens apex and image.

2. A spherically corrected Fresnel mirror with partial field correction, comprising an optically effective face whose curvature in the meridional plane is determined by the equation $$\frac{h \cdot \sin \delta \cdot \cos \delta}{h \cdot \sin \delta' \cdot \cos \delta' - y \cdot \sin \delta' \cdot \sin \delta \cdot \sin(\delta + \delta')} + \beta' = 0$$

in which the trigonometric functions signify $$\sin \delta = \frac{h}{(s-p)\sqrt{1+\frac{h^2}{(s-p)^2}}} \quad \sin \delta' = \frac{h}{(s'-p)\sqrt{1+\frac{h^2}{(s'-p)^2}}}$$

$$\cos \delta = \frac{1}{\sqrt{1+\frac{h^2}{(s-p)^2}}} \quad \cos \delta' = \frac{1}{\sqrt{1+\frac{h^2}{(s'-p)^2}}}$$

and a Fresnel system on said face, the normal to said Fresnel system consisting of echelons, each of said echelons having an effective and a disturbing non-imaging flank, said effective flank and the optical axis of the mirror enclosing an angle satisfying the equation $$\varphi = \frac{\delta' + \delta}{2}$$

$h$ being the height of incidence of the aperture beam and the coma beam at the face, $p$ the rise of this face, $y$ the space intervening between the optical axis and an object point in respect of which field correction is desired, $\beta'$ the image scale, $\varphi$ the angle enclosed by the optical axis and the normal to the effective echelon flank, $\delta$ the angle enclosed by the optical axis and the aperture beam on the object side, $\delta'$ the angle enclosed by the optical axis and the aperture beam on the image side, $s$ the distance between object and lens apex, and $s'$ the distance between lens apex and image.

3. An imaging element corrected spherically and near its axis for coma, comprising at least one aplanatic face determined by the equation $$\frac{n \sin \delta \cos \delta \cos \epsilon}{n' \sin \delta' \cos \delta' \cos \epsilon'} - \beta' = 0$$

and a Fresnel system on said face, said Fresnel system consisting of echelons, each of said echelons having an effective and a disturbing non-imaging flank, the normal to said effective flank and the optical axis of the imaging element enclosing an angle satisfying the equation $$\tan \varphi = \frac{n' \sin \delta' - n \sin \delta}{n' \cos \delta' - n \cos \delta}$$

the trigonometric functions in the foregoing two equations signifying $$\sin \varphi = \frac{n' \cdot \sin \delta' - n \cdot \sin \delta}{\sqrt{n'^2 - 2n' \cdot n \cdot \cos(\delta' - \delta) + n^2}}$$

$$\cos \varphi = \frac{n' \cdot \cos \delta' - n \cdot \cos \delta}{\sqrt{n'^2 - 2n' \cdot n \cdot \cos(\delta' - \delta) + n^2}}$$

$$\cos \epsilon = \frac{n' \cdot \cos(\delta' - \delta)}{\sqrt{n'^2 - 2n' \cdot n \cdot \cos(\delta' - \delta) + n^2}}$$

$$\cos \epsilon' = \frac{n' - n \cdot \cos(\delta' - \delta)}{\sqrt{n'^2 - 2n' \cdot n \cdot \cos(\delta' - \delta) + n^2}}$$

$$\sin \delta = \frac{h}{(s-p)\sqrt{1+\frac{h^2}{(s-p)^2}}} \quad \sin \delta' = \frac{h}{(s'-p)\sqrt{1+\frac{h^2}{(s'+p)^2}}}$$

$$\cos \delta = \frac{1}{\sqrt{1+\frac{h^2}{(s-p)^2}}} \quad \cos \delta' = \frac{1}{\sqrt{1+\frac{h^2}{(s'-p)^2}}}$$

$\beta'$ being the image scale, $\varphi$ the angle enclosed by the optical axis and the normal to the effective echelon flank, $n$ the refractive index of the medium in front of the face, $n'$ the refractive index of the medium in the rear of the face, $\epsilon$ the angle enclosed by the normal to the effective echelon flank and the aperture beam on the object side, $\epsilon'$ the angle enclosed by the normal to the effective echelon flank and the aperture beam on the image side, $\delta$ the angle enclosed by the optical axis and the aperture beam on the object side, $\delta'$ the angle enclosed by the optical axis and the aperture beam on the image side, $h$ being the height of incidence of the aperture beam and the coma beam at the face, $p$ the rise of this face, $s$ the distance between object and lens apex, and $s'$ the distance between lens apex and image.

References Cited

FOREIGN PATENTS 660,352  11/1951  Great Britain.
902,536  8/1962  Great Britain.
1,167,057  4/1964  Germany.

DAVID SCHONBERG, Primary Examiner

R. J. STERN, Assistant Examiner

U.S. Cl. X.R.

350—292

PO-1050
(5/69)

UNITED STATES PATENT OFFICE
CERTIFICATE OF CORRECTION

Patent No. 3,523,721          Dated August 11, 1970

Inventor(s) Christian HOFMANN

It is certified that error appears in the above-identified patent and that said Letters Patent are hereby corrected as shown below:

In Patent Claim 2, line 49 of Column 9, cancel the words "the normal to"

line 52 of Column 9, before "said effective flank" enter -- the normal to --

In Patent Claim 3, line 30 of Column 10, change the equation in the second quotient, under the square root sign thereof from "$(s'+p)^2$" to -- $(s'-p)^2$ --

SIGNED AND
SEALED
NOV 3 1970

(SEAL)
Attest:

Edward M. Fletcher, Jr.
Attesting Officer

WILLIAM E. SCHUYLER, JR.
Commissioner of Patents